(12) United States Patent
Engesser et al.

(10) Patent No.: US 7,417,342 B2
(45) Date of Patent: Aug. 26, 2008

(54) HOLDER FOR WINDING WIRES FOR STATORS OF ELECTRIC MOTORS

(75) Inventors: Martin Engesser, Donaueschingen (DE); Stefan Schwamberger, Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/520,468

(22) Filed: Sep. 12, 2006

(65) Prior Publication Data
US 2007/0063598 A1 Mar. 22, 2007

(30) Foreign Application Priority Data
Sep. 16, 2005 (DE) ................ 10 2005 044 309

(51) Int. Cl.
*H02K 11/00* (2006.01)
(52) U.S. Cl. ............................. 310/71; 310/260
(58) Field of Classification Search .............. 310/71, 310/67 R, 260, 270
See application file for complete search history.

(56) References Cited

U.S. PATENT DOCUMENTS

| | | | | |
|---|---|---|---|---|
| 4,039,875 A | * | 8/1977 | Morreale | 310/194 |
| 4,096,625 A | * | 6/1978 | Morreale | 29/596 |
| 4,182,026 A | * | 1/1980 | Searle | 29/596 |
| 4,224,543 A | * | 9/1980 | Morreale | 310/71 |
| 5,436,517 A | * | 7/1995 | Ogawa | 310/91 |
| 5,717,273 A | * | 2/1998 | Gulbrandson et al. | 310/260 |
| 5,990,589 A | * | 11/1999 | Ushikoshi | 310/90 |
| 6,566,779 B2 | * | 5/2003 | Takano et al. | 310/214 |
| 6,628,023 B1 | * | 9/2003 | Paquet | 310/71 |
| 6,856,055 B2 | * | 2/2005 | Michaels et al. | 310/71 |
| 6,922,002 B2 | * | 7/2005 | Godo et al. | 310/216 |
| 6,961,989 B2 | * | 11/2005 | Miya et al. | 29/596 |
| 7,247,962 B2 | * | 7/2007 | Burgbacher | 310/71 |
| 2005/0189139 A1 | * | 9/2005 | Stole | 174/260 |
| 2007/0040467 A1 | * | 2/2007 | Gu | 310/216 |
| 2007/0063598 A1 | * | 3/2007 | Engesser et al. | 310/71 |

* cited by examiner

Primary Examiner—Tran Nguyen
(74) Attorney, Agent, or Firm—Cooper & Dunham LLP

(57) ABSTRACT

The invention relates to a holder for the winding wires for stators of electric motors consisting of a component to be disposed on the stator having means for holding and guiding the winding wires that run between the individual stator windings. According to the invention, the holder is designed as a part of a circuit board for connecting the phase windings.

9 Claims, 1 Drawing Sheet

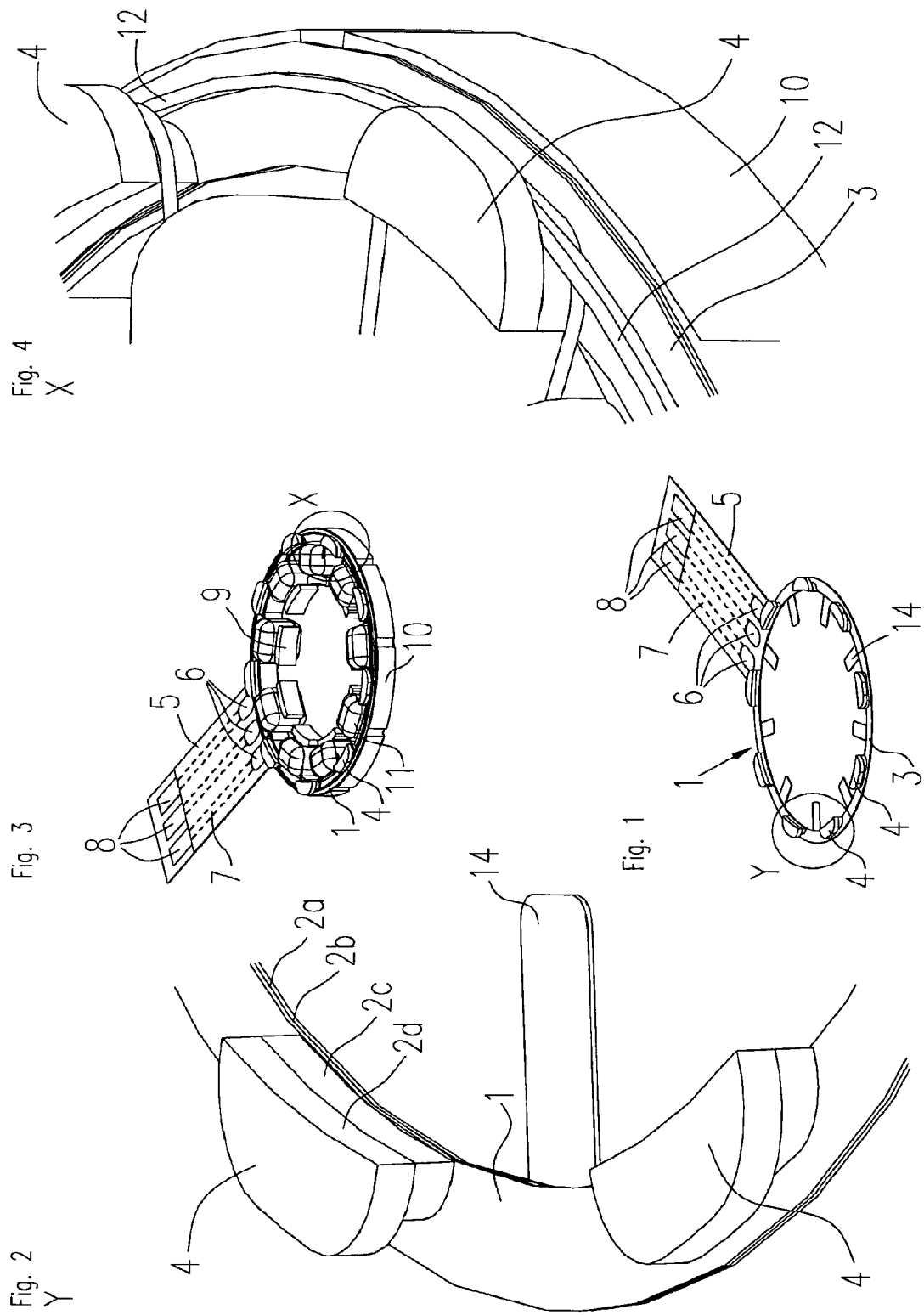

HOLDER FOR WINDING WIRES FOR STATORS OF ELECTRIC MOTORS

BACKGROUND OF THE INVENTION

The invention relates to a holder for winding wires for stators of electric motors according to the characteristics of the preamble of claim 1, in particular to such a holder for small-scale electric motors, such as spindle motors used for driving hard disk drives.

DESCRIPTION OF THE PRIOR ART

Spindle motors are generally multi-phase motors having several poles per phase. In the case of a 3-phase motor having 9 poles, for example, every third pole is wound with the same phase winding. Here, it is necessary to lead the connecting wires between the individual windings of one phase along the stator and to attach them, or to lead the wire ends to the terminal points. Particularly in the case of miniature motors, manual attachment of the winding wires is made very difficult due to the small dimensions. It is known to lead the connecting wires of the stator windings of one phase around plastic inserts, called bobbins, or over a tongue bent from a stator lamination. The use of plastic inserts has the disadvantage that they are relatively expensive to manufacture and have to be fixed to the stator in an additional assembly procedure. Using lamination tongues, on the other hand, reduces the available space left over for the windings or for the winding device.

SUMMARY OF THE INVENTION

It is thus the object of the invention to improve a holder for winding wires for stators of electric motors with respect to their manufacturing costs and assembly-friendliness.

This object has been achieved according to the invention by the characteristics outlined in patent claim 1.

Preferred embodiments and advantageous developments of the invention are cited in the subordinate claims.

According to the invention, the holder for the winding wires is designed as a part of a circuit board, such as a printed circuit board (PCB), for the purpose of connecting the phase windings.

The phase windings of an electric motor have to be connected. To this effect, it is known to connect the wire ends of the stator windings by means of a separate PCB or a flexible circuit board (FCB) or suchlike, and to lead them to the connector plug. These kinds of PCBs for connecting the winding wires are described in U.S. Pat. No. 6,204,996 B1 and U.S. Pat. No. 6,057,616 A.

Proposed is an integration of the functions of both a holder for the winding wires and a printed circuit to connect these winding wires. Compared to a conventional bobbin, the solution according to the invention involves only low additional costs for the manufacture of the printed circuit. There is no longer need for a separate part as a holder for the winding wires.

According to a preferred embodiment of the invention, the holder is built up of several layers of material. The holder is preferably manufactured in a lamination process and comprises several lamination layers.

Apart from the circuit board, the holder comprises an annular part on which a plurality of wire guiding elements are arranged and distributed, the wire guiding elements being constructed from at least one layer of material.

In another embodiment of the invention, it is not only possible for the annular part to have a plurality of wire guiding elements but also an appropriate number of (molded) winding members for the stator windings.

A preferred embodiment of the invention is described below on the basis of the drawings. Further characteristics, advantages and possible applications of the invention can be derived from this.

BRIEF DESCRIPTION OF THE DRAWINGS

FIG. 1 is a perspective view of the holder according to the invention;

FIG. 2 is an enlarged view of a part of the holder of FIG. 1;

FIG. 3 is a perspective view of a holder according to the invention that is disposed on the stator of an electric motor;

FIG. 4 is an enlarged view of the arrangement according to FIG. 3.

DESCRIPTION OF A PREFERRED EMBODIMENT OF THE INVENTION

A holder 1 according to the invention for the winding wires of stator windings of a spindle motor is shown in FIG. 1. The holder 1 consists substantially of an annular part 3, whose dimensions are adjusted to fit the likewise annular stator of an inner rotor spindle motor, and a circuit board 5, preferably a flexible circuit board, designed to be integrated with the annular part 3. The annular part 3 of the holder 1 is provided with a plurality of hook-like, outwards-directed wire guiding elements 4, the number of wire guiding elements 4 preferably corresponding to the number of stator poles, there being nine stator poles in the illustrated embodiment. In the case of outer rotor motors, the wire guiding elements 4 are directed inwards accordingly.

As can be particularly seen in FIG. 2, the holder 1 consists of several lamination layers 2a, 2b, 2c and 2d made of plastics or any other suitable materials, the wire guiding elements 4 in the illustrated embodiment being formed from the two top lamination layers 2c and 2d. Here, the upper lamination layers 2c and 2d are thicker than the lower layers 2a and 2b, the desired form of the wire guiding elements 4 being punched out before lamination or routed out after lamination respectively. It is particularly useful to punch out forms that form the wire guiding elements 4 connected at their outside circumference, to then connect (laminate) these forms, which can consist of several different lamination layers, to the annular part 3 and then punch them out. Winding members 14 cover the top of the stator poles 9, as shown in FIGS. 1 and 2.

The circuit board 5 has substantially the same layered construction as the annular part 3, appropriate metallic strip conductors 7 and solder pads 6 for connecting the wire ends of the stator windings, however, being provided in this case in the lamination construction. A contact field 8 is located at the free end of the circuit board 5 to which the connector for the motor electronics is connected.

FIG. 3 shows the holder 1 mounted on a stator arrangement. In the conventional way, the stator arrangement comprises a stator lamination ring 10 on which a plurality of stator poles 9 are formed. The motor in the illustrated embodiment is an inner rotor motor so that the stator poles 9 are disposed at the inside circumference of the lamination ring 10 and directed towards the center of the ring. Each stator pole 9 carries a stator winding 11. In the case of a 3-phase stator arrangement, as shown in FIG. 3, there are nine stator poles 9, for example, every third pole being wound with the same phase winding. An option here is to use a delta connection for the phase windings, each connecting point of two phase windings being connected to one of the solder pads 6 and led via the strip conductors 7 to the contact fields 8.

FIG. 4 shows an enlarged view of the arrangement in FIG. 3, where it can be seen that the winding wire 12 is led from a stator winding 11 along the annular part 3 and through the wire guiding elements 4 to the next stator winding of the same phase. The ends of the winding wires 12 as well are then led via these guiding elements 4 to the solder pads 6.

The holder 1 is preferably bonded to one side of the stator arrangement and, according to the invention, fulfils not only the object of acting as a holder for the winding wires 12 but also the object of connecting the winding wires via the integrated flexible circuit board 5.

IDENTIFICATION REFERENCE LIST

1 Holder
2a, 2b, Lamination layers
2c, 2d
3 Annular part
4 Wire guiding element
5 Circuit board
6 Solder pad
7 Strip conductor
8 Contact field
9 Stator pole
10 Stator lamination ring
11 Stator winding
12 Winding wire

The invention claimed is:

1. A holder for wires connecting a plurality of stator coils on the stator of an electric motor, the holder comprising:
a wire routing element mounted coaxially on the stator;
a plurality of wire guide members extending axially from said wire routing element, each of said wire guide members having a channel to hold and position at least one wire connecting one stator coil to another stator coil of the same phase; and
a printed circuit board integral with said wire routing element, said printed circuit board having at least one solder pad to which wires extending from stator coils having a common phase are affixed.

2. The holder according to claim 1, characterized in that the holder is made up of several layers of material (2a-2d).

3. The holder according to claim 2, characterized in that the holder consists of several lamination layers (2a-2d).

4. The holder according to claim 1, characterized in that the holder comprises an annular part (3) on which said plurality of wire guide members (4) are arranged and distributed, said printed circuit board extending radially away from said annular part.

5. The holder according to claim 4, characterized in that the wire guide members (4) are formed from at least one layer of material (2c, 2d).

6. The holder according to claim 1, characterized in that the holder comprises a plurality of winding members (14) for the stator windings (11).

7. The holder of claim 1 in which the number of wire guide members corresponds to the number of stator coils.

8. The holder of claim 1 in which the number of solder pads corresponds to the number of stator coil phases.

9. The holder of claim 1 in which said wire routing element is coextensive with the stator.

* * * * *